Figure 9:
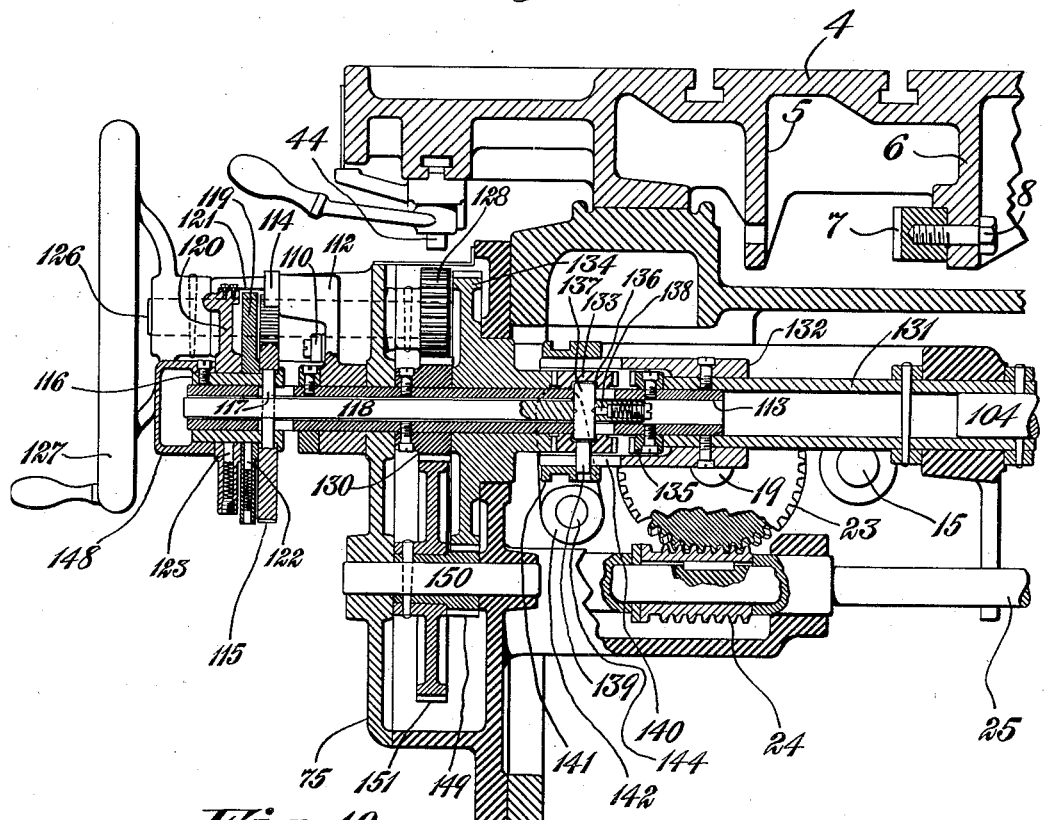

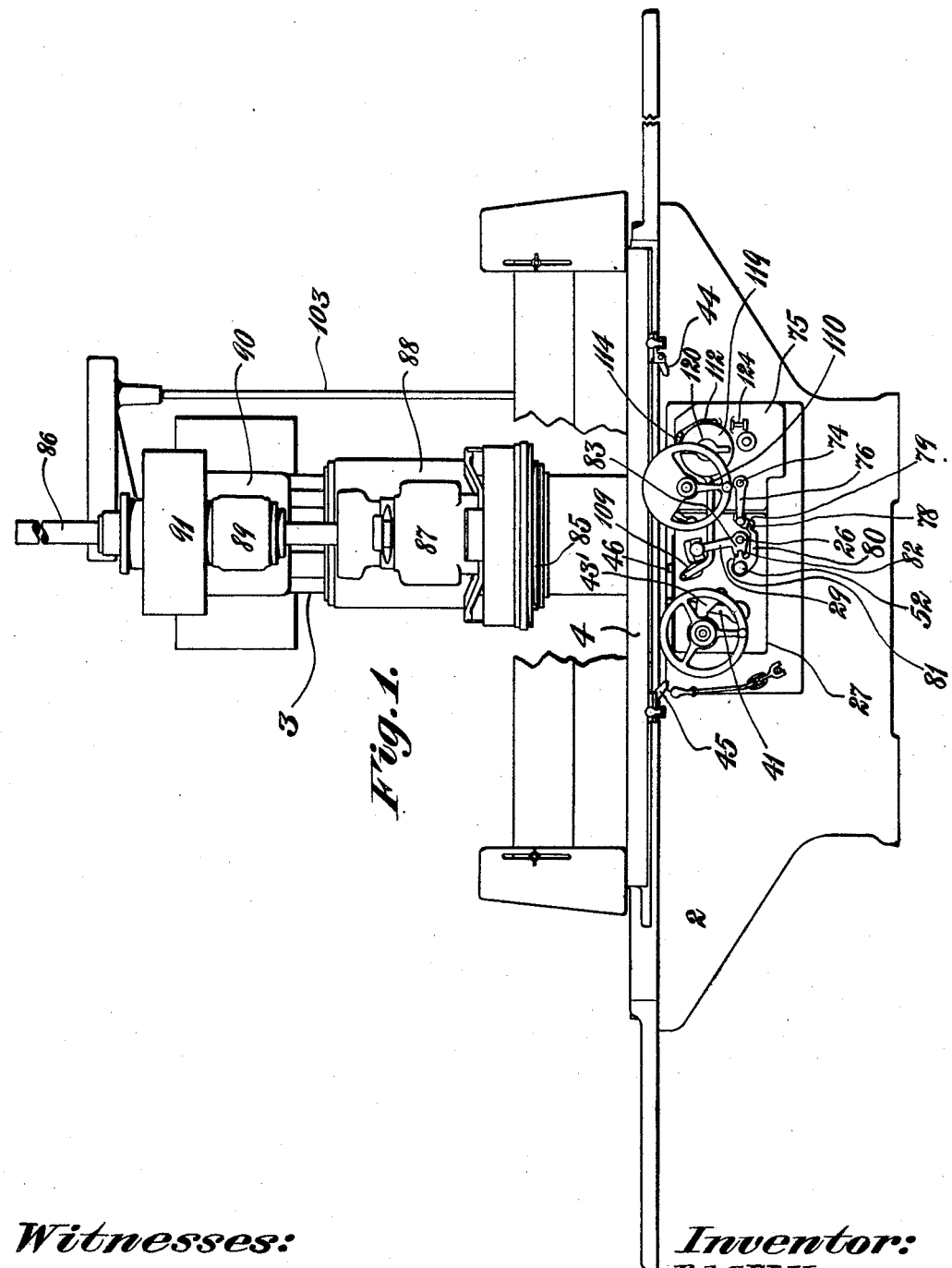

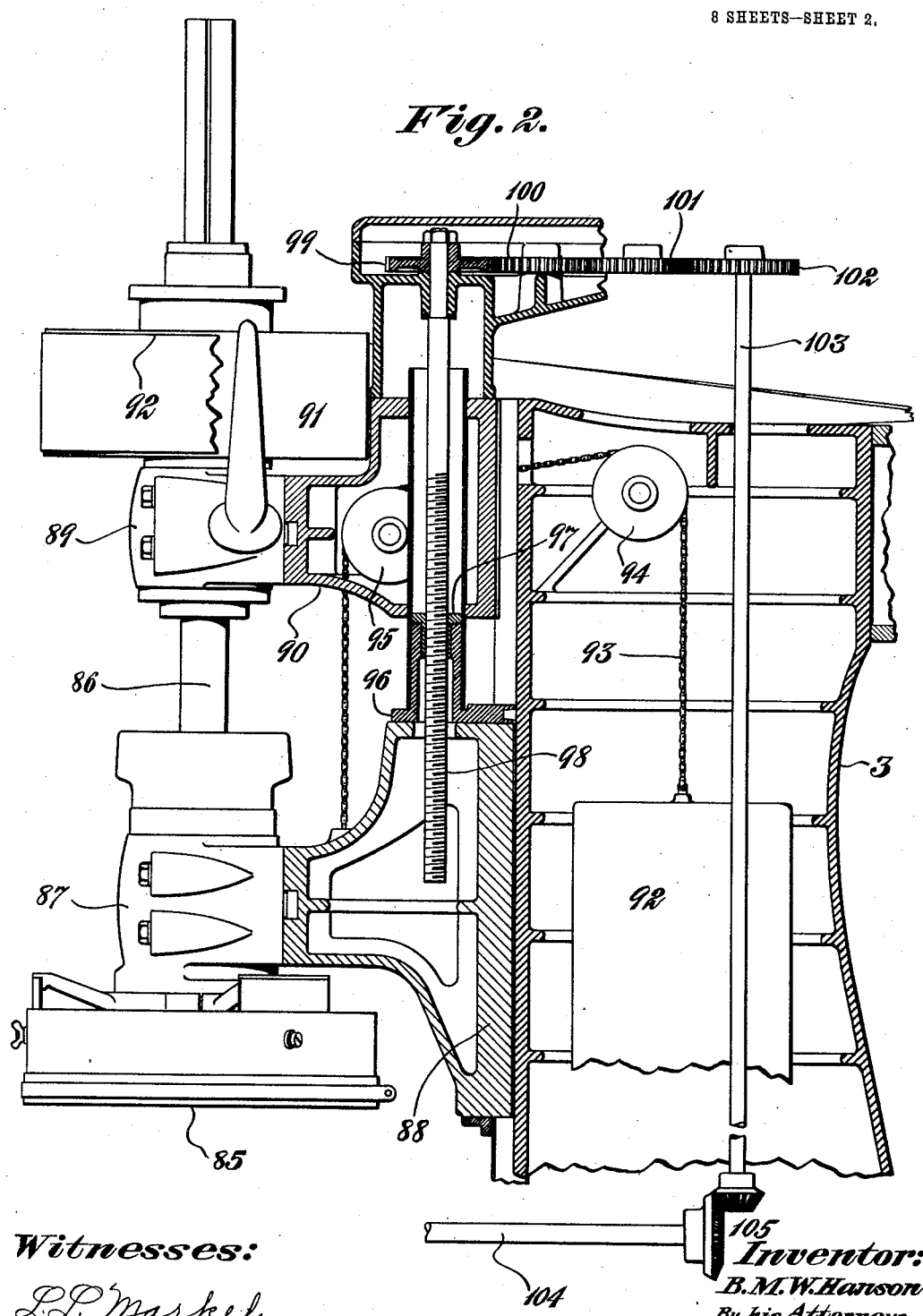

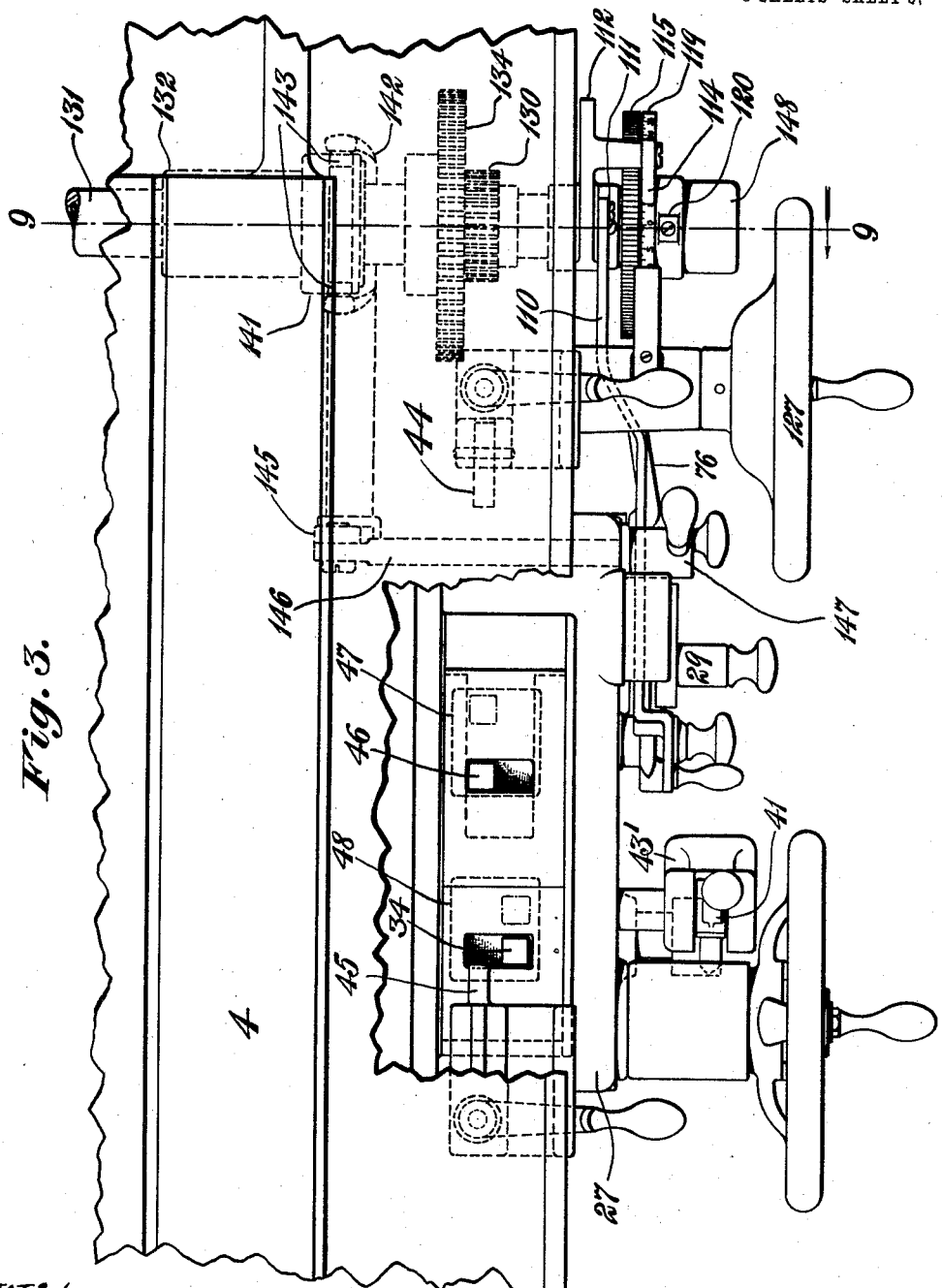

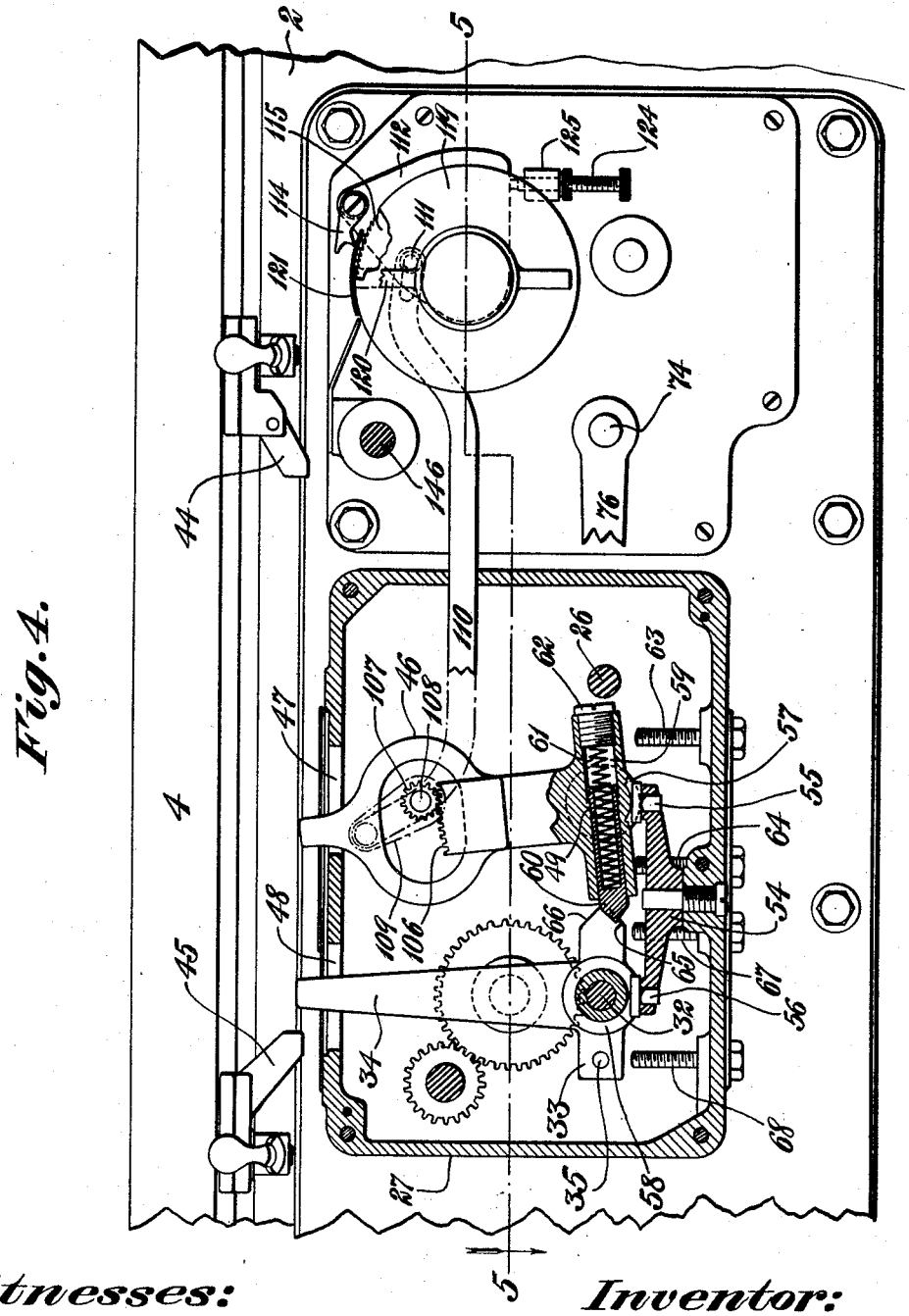

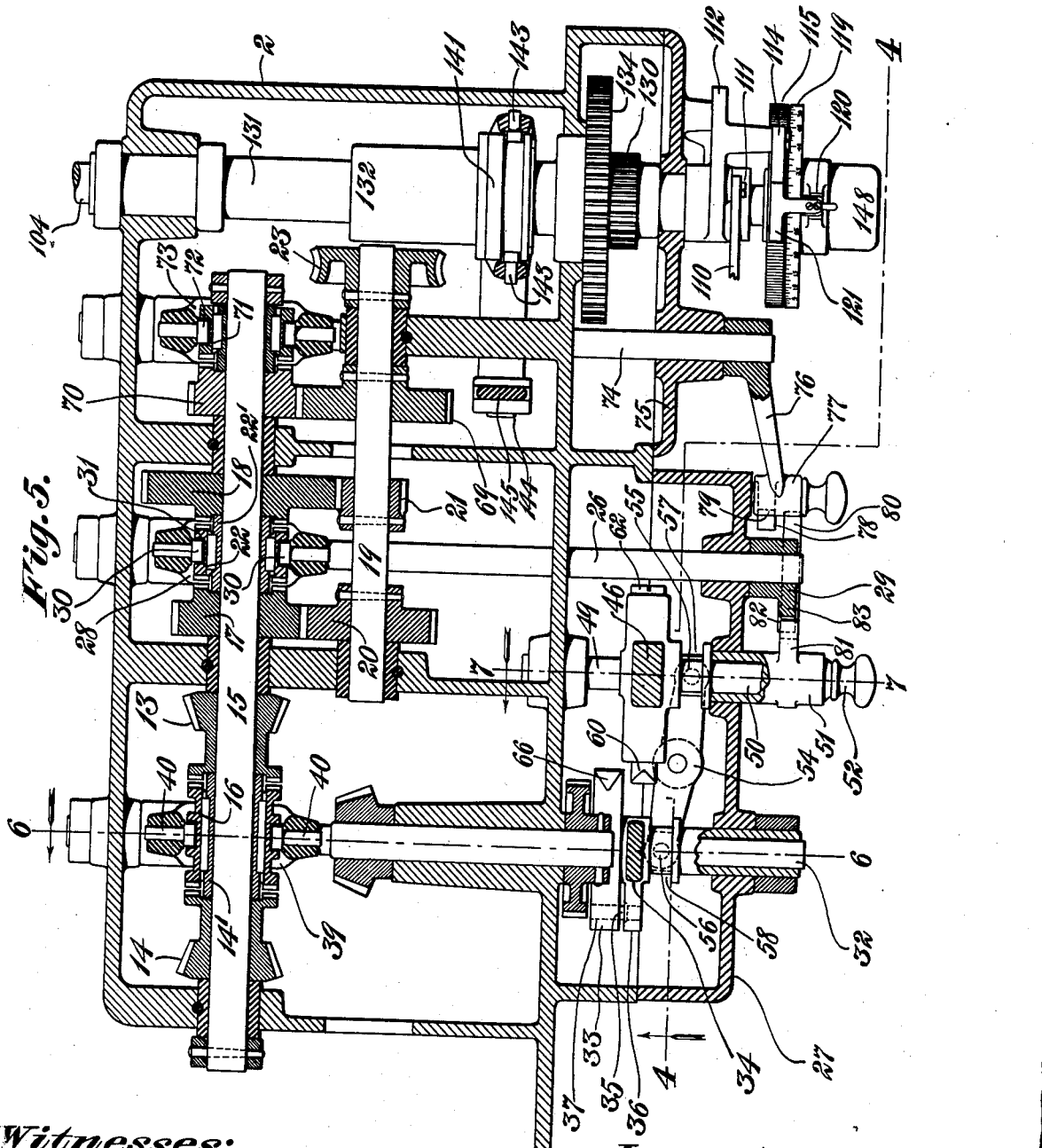

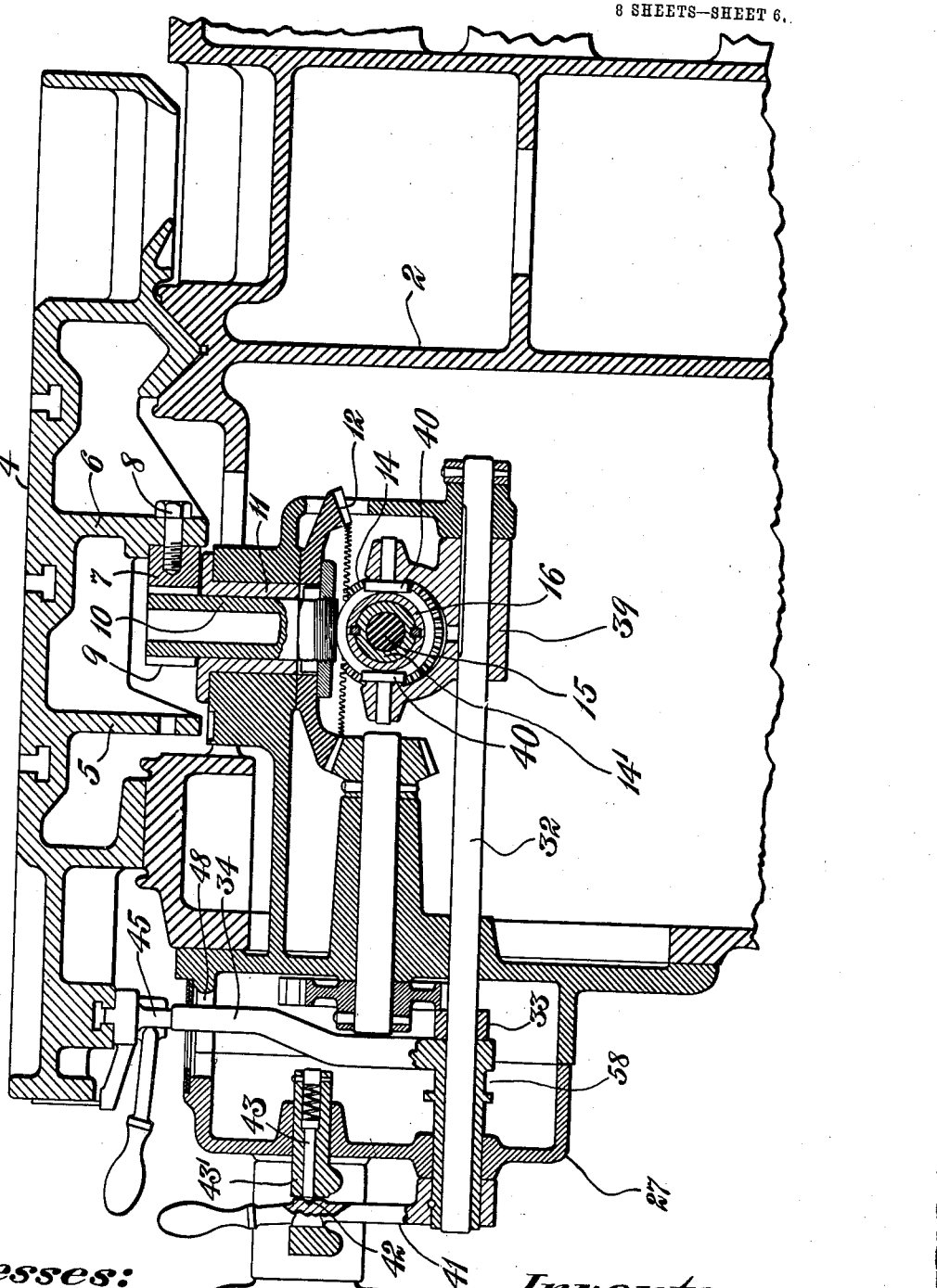

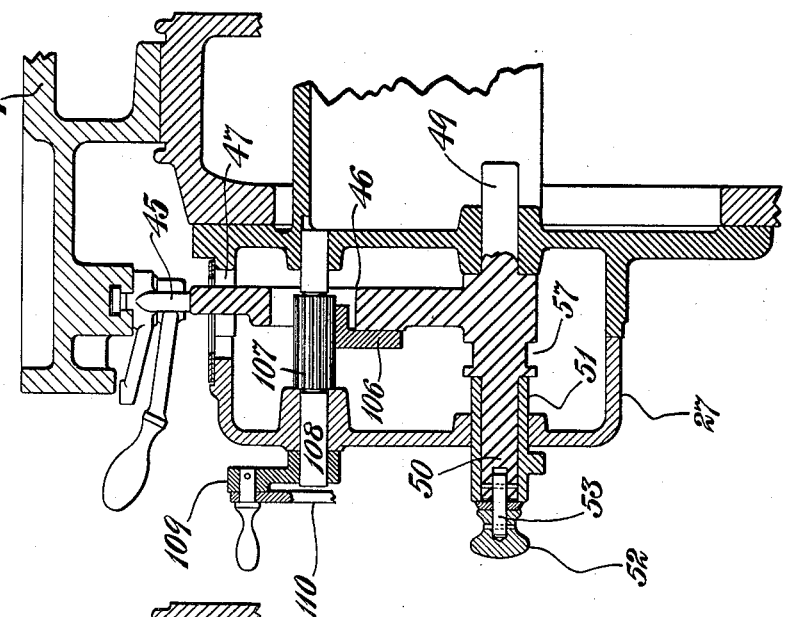
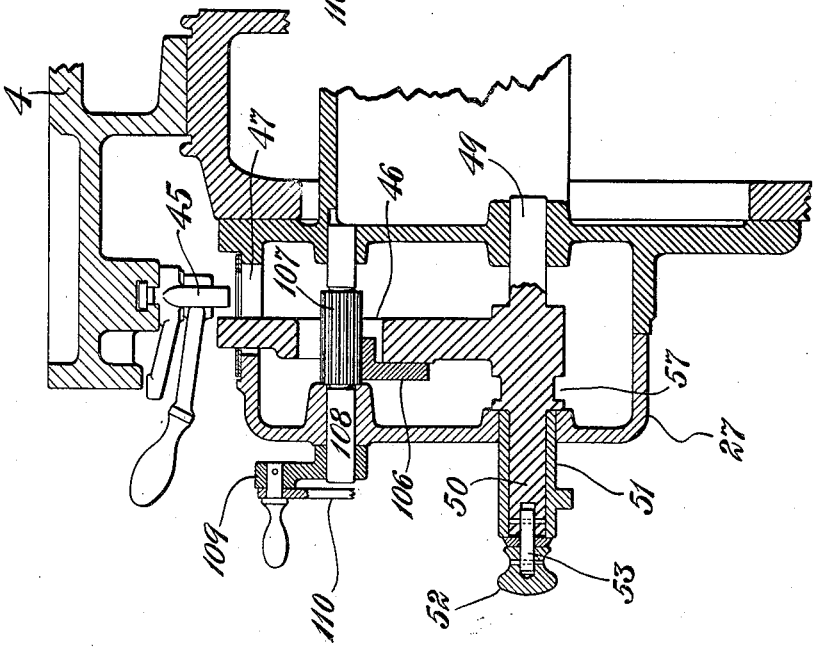

B. M. W. HANSON.
METAL WORKING MACHINE.
APPLICATION FILED JAN. 30, 1914.

1,110,325.

Patented Sept. 15, 1914.

8 SHEETS—SHEET 8.

Witnesses:

Inventor:
B. M. W. Hanson
By his Attorneys,
Sutherland & Anderson

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-WORKING MACHINE.

1,110,325.   Specification of Letters Patent.   Patented Sept. 15, 1914.

Application filed January 30, 1914. Serial No. 815,477.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to metal-working machines. A metal-working machine involving my invention can be used for a variety of purposes. In the present instance it is organized for grinding.

One of the primary purposes of the invention is the provision of means of an effective character whereby a traveling carriage can be automatically reversed when the main feed mechanism is in action and whereby the motion of the carriage can be automatically arrested when an auxiliary driving mechanism is in action, the auxiliary driving mechanism preferably but not essentially operating the carriage at a higher speed than the main driving mechanism and being utilized for any desirable purpose, for instance when it is desired to get the work out of or into the range of action of the tool in a rapid manner.

Another object of the invention is the provision of means of an equally effective character by which the tool can be operated by hand, preferably quickly or automatically, preferably slowly.

The invention includes other features of novelty and advantage, which with the foregoing will be set forth at length in the following description, wherein I will describe in detail that one of the several forms of embodiment of the invention which I have selected for illustration in the drawings accompanying and forming part of the present specification. I do not limit myself to this disclosure; I may depart therefrom in several respects within the scope of the invention defined by the claims following said description.

Figure 10:
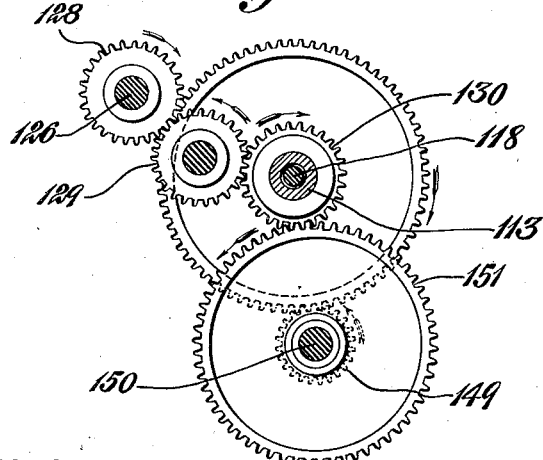

Referring to said drawings: Figure 1 is a front elevation of a metal-working machine involving my invention. Fig. 2 is a vertical sectional side elevation of the upper part of the column of said mechanism, as seen from the right in Fig. 1. Fig. 3 is a top plan view of the intermediate portion of the table with a part broken out and with certain actuating and controlling devices hereinafter more particularly described. Fig. 4 is a front elevation of the lower part of the machine, a boxing being in section on the line 4—4 of Fig. 5, certain of the parts inclosed by said boxing being also in section. Fig. 5 is a horizontal section on the line 5—5 of Fig. 4. Fig. 6 is a transverse section on the line 6—6 of Fig. 5. Figs. 7 and 8 are similar sections on the line 7—7 of Fig. 5, the parts being in different positions in these two views. Fig. 9 is a transverse section on the line 9—9 of Fig. 3. Fig. 10 is a detail view of gearing hereinafter more particularly described.

Like characters refer to like parts throughout the several views, which it will be noted are on different scales, and it will also be perceived that where section lines are used arrows indicate the line of view.

The framing for supporting the different parts of the machine may be of any desirable character; that shown comprises a hollow base or bed as 2 and the column as 3 rising from the rear thereof. The base or bed constitutes a convenient support for a movable carrier which may be of any suitable nature and which may be utilized in any desirable manner. A carrier such as meets the necessary conditions consists of the reciprocatory work-supporting table 4, the base or bed 2 having ways on its upper side as common in this art to receive and guide the table. The work may be connected with the reciprocatory table 4 in any of the many ways now in use for this purpose, none, however, being shown, as the invention does not concern the same.

The means by which the table is reciprocated or otherwse operated may vary decidedly as to character. That illustrated and now to be described is quite satisfactory. Said table is provided with duplicate flanges 5 and 6 to one of which, as the flange 6 on the inner face thereof, is fastened the rack bar 7, screws 8 being shown for the purpose. In mesh with the teeth of this rack bar 7 (Fig. 6) is the pinion 9 integral with the upper end of the stub shaft 10 rotative in a bushing 11 fitted in an opening in the upper side of the bed 2. Fastened in suitable way to the lower end of this stub shaft 10 is the bevel gear 12 in mesh with the oppositely rotative bevel gears 13 and 14 (Fig. 5) constituting suitable power transferring members and loose on the shaft 15 sustained by bearings inside the bed 2. Between the bevel pinions 13 and 14 and keyed to the sleeve 14' fixed to the shaft 15 is the clutch member 16, the terminal portions of which are provided with teeth or their equivalents to engage practically similar teeth at the inner ends of the hubs of the two facing bevel pinions 13 and 14. In Fig. 5 the clutch member 16 is shown as occupying its neutral position. If this clutch member 16 be engaged with the bevel pinion 13, the carriage or table 14 will through the described parts be moved in one direction, whereas if it be engaged with the companion bevel pinion 14 the carriage also through said described parts will be moved in the opposite direction. It will, therefore, be clear that the clutch member 16 constitutes one of several advantageous ways of reversing the carriage or table 4 at the ends of its respective movements.

The table can be driven in opposite directions at a uniform or plurality of different speeds secured by main driving mechanism of some suitable kind. In the construction shown I have made provision for simply two of such speeds, although this is not a matter of consequence. These might be considered the normal speeds of the carriage. In addition to these normal speeds there is a very quick or accelerated speed obtained by auxiliary driving mechanism of some convenient character and which is utilized in the present case, to rapidly move the carriage from the tool or equivalent part to a point where the work can be dismounted therefrom and a new piece or pieces mounted in lieu thereof. This feature, however, will be hereinafter described, although I will now describe the main driving mechanism which has sub-mechanisms whereby different speeds can be secured on either movemnt of the carriage or table 4 at the will of the operator. Loose on the shaft 15 (Fig. 5) are the spur gears 17 and 18, the gear 18 being of larger diameter than the gear 17. Supported for rotation by bearings in the bed 2 is the shaft 19 parallel as shown with the shaft 15 and to which are shown rigidly connected the spur gears 20 and 21 in mesh with the gears 17 and 18 respectively. This shaft 19 as will hereinafter appear is continuously driven. Between the gears 17 and 18 is the clutch member 22 keyed to the sleeve 22' fastened to the shaft 15 and shown in Fig. 5 as occupying its neutral position and as having teeth to coöperate with similar teeth on the adjacent faces of the gears 17 and 18. If the clutch-member 22 be engaged with the spur-gear 18 the latter will be clutched to the shaft 15, so that the latter will be driven by the spur-gear 21 and companion gear 18 whereas if the gear 17 be clutched to the shaft 15, the latter will be driven by the gears 20 and 17 and at a more rapid speed than when driven by the gears 21 and 18, owing to the fact that the primary gear 21 is of much smaller diameter than the primary gear 20. Any desirable means may be provided for shifting the clutch member 22, although those shown and hereinafter described are satisfactory. There is represented fastened as by pinning, to the outer end of the shaft 19 the worm gear 23 in mesh with the worm 24 (Fig. 9) rigid with the main shaft 25 and which latter after the usual fashion may be driven by a pulley, belt-wheel or equivalent device, none of which is shown, however, as the invention does not relate thereto and also for the further reason that the same is very old.

Reference has been made to a clutch member 22; the means shown for operating this clutch are now to be described. Supported by the front and rear walls of the bed 2 for rocking movement, is the shaft 26 which extends through the front wall of the bed and also through the front of the boxing or housing 27 (Fig. 5) on the forward side of the bed. Fastened to the rear end of this rock shaft 26 is the yoke 28, the branches of which have studs 30 fitting a peripheral channel 31 in said clutch member 22. To rock the shaft 26 to alternately move the clutch 22 into engagement with the gears 17 and 18, the hand lever 29 may be provided (Figs. 1 and 5), said hand lever being rigidly fastened to the forward projecting end of said shaft. Said hand lever in both Figs. 1 and 5 is shown as occupying its neutral position. There are locking devices associated with it as will hereinafter appear. In addition to these locking devices, the handle may be equipped with the usual detent for holding it in its three positions. It will be assumed that it is freed by the locking mechanism and that it occupies its neutral or intermediate position. If the said hand-lever is swung to the right in Fig. 1 the clutch member 22 is moved in a corresponding direction (Fig. 5) to engage the gear 18 whereby the shaft 19 becomes effective as already set forth to drive the shaft 15 through the gears 21 and 18, consequently rotating the shaft 15 at its slow speed so that if the clutch-member 16 be in engagement with either of the bevel gears 13 and 14 the carriage or table 4 will be moved. If the hand lever 29 is thrown to the left in Fig. 1, the clutch member 22 will engage the gear 17 so that the shaft 19 will through the meshing gears 20 and 17 drive the shaft 15 and also the carriage but at a higher speed than before, provided the clutch member 16 be in engagement with one of the two gears 13 and 14.

As I have already observed there is a main feed mechanism for the carriage 4, and this feed mechanism may be of such character as to secure the movement of the carriage at one or several speeds. This main fed mechanism is what is utilized during work. In addition to the main feed mechanism there is an auxiliary feed mechanism, and this is of a nature to effect a different kind of movement of the carriage or table 4; in the present case this last mentioned movement is a very rapid one and is called into requisition when it is desired to shift the carriage from its working relation to a work-receiving or work-applying position thus insuring economy of time. As will hereinafter appear means are provided for preventing positively the simultaneous action of the main and auxiliary carriage or table driving or feed mechanisms, so that no injury can result as would be the case were they accidentally put into action at the same time.

Supported by the front wall of the bed 2 and by a suitable bearing therein is the rock shaft 32 (Figs. 4 and 6). This shaft has fastened to it the hub or central portion of a bar 33 (Figs. 4, 5 and 6) and it also extends through the hub of a rocker 34 constituting a convenient form of secondary actuator and the function of which will be hereinafter explained. The hub of this actuator or rocker is elongated and is supported on a bearing opening in the front of the boxing 27. For a reason that will hereinafter appear the rocker 34 is slidable on the shaft 32, although at all times it is connected with the bar 33 for instance by the pin 35 rigid with the lateral extension 36 of the hub of said rocker 34, projecting into a perforation 37 in the tail of said bar (Fig. 5). It will be clear, therefore, that when the rocker 34 is oscillated it imparts a like motion to the bar 33 and therefore to the shaft 32. To the inner end of said shaft 32 is shown fastened the yoke 39 (Figs. 5 and 6) the branches of which have studs 40 entering a peripheral channel in the clutch member 16 to which I have already referred. Pinned or otherwise fastened to the projecting ends of the elongated hub of the rocker 34 is the hand lever 41 (Fig. 6) having between its ends the socket 42 to receive the tip of the spring plunger 43 supported by the member 43' slidably supported by the boxing or housing 27, when said hand lever is in its neutral position at which time the yoke 39 and clutch member 16 will be in their neutral positions. The plunger 43 prevents accidental movement of the lever 41 from which it will be clear that said lever can be readily swung in either direction from its neutral position by the operator. It will be assumed that the shaft 19 is in motion and that the clutch members 16 and 22 are occupying their neutral positions. As a result the table or carriage 4 will be at rest. To start the table the hand lever 41 will be thrown over to thereby through the intermediate parts, cause the clutch member 16 to engage one of the bevel gears 13 or 14 and at the same time the hand lever 29 will be operated to clutch one of the gears 17 and 18 to the shaft 15 as already hereinbefore set forth. It has been assumed in the statement just made that the lever 29 is unlocked; this in fact is its normal relation. The carriage 4 when the two clutch members are thus operated will be caused to travel and will continue its movement until it is reversed, such motions succeeding each other until the clutch member 16 is thrown to neutral. In the normal operation of the machine or during actual work the clutch member 16 will be only moved to neutral by the shifting of the lever 41 but when the quick feed mechanism is in action, this clutch member 16 will be automatically moved to neutral position as will be pointed out hereinafter. As already set forth the rocker 34 in addition to its rocking movement has two other positions, an inner position which it occupies during work and an outer position to which it is moved, by hand in the present case, when the quick feed mechanism is to be used. To all intents and purposes, therefore, the bar 33 is relatively fixed, the plunger 43 by acting against the lever 41 maintaining this particular condition.

As a means for reversing the movement of the table or carriage 4 the customary adjustable dogs 44 and 45 may be utilized, they acting in conjunction with a suitable primary actuator such as the rocker 46 (Figs. 3, 4 and 5). The upper end of this primary actuator or rocker 46 extends through a slot 47 in the top of the boxing 27, said slot being of such shape as to permit the necessary oscillation of the rocker 46 and also lateral movement thereof for a reason that will hereinafter appear. The top of the boxing 27 has a similar slot 48 through which the upper end of the rocker 34 extends, and this slot 48 also is of such size as to permit free rocking or lateral motions of said rocker 34. During normal or working operation the dogs 44 and 45 coöperate with the rocker 46 which in turn acts on the rocker 34 to effect reversals of the carrier 4, whereas during the time the quick feed is in action the rocker 46 is out of the path of movement of the dogs 44 and 45, while the rocker 34 is in said path. The rocker 46 is approximately of inverted T-shape and at the junction of its branches there extend oppositely the trunnions 49 and 50 (Fig. 5), the trunnion 49 being supported by a bearing in the front wall of the bed 2, while the trunnion 50 works in a bushing 51 fitted for sliding movement in an opening in the front of the boxing or housing 27. It will be remembered that the rocker 46 has been described as capable of lateral motion so as to move it into and out of the path of the two dogs 44 and 45. To thus operate the rocker 46 the knob 52 (Figs. 5, 7 and 8) may be provided the knob or trunnion 51 having mating sockets to receive the coupling stud 53 which is connected as by pinning or otherwise to the knob 52 and trunnion 50 respectively. Between the two rockers 34 and 46 in the boxing or housing 27, is supported for oscillation the rocking member 54 which as shown moves about a vertical axis and which at its opposite ends is provided with studs 55 and 56 (Figs. 4 and 5), the stud 55 entering the peripheral channel 57 of the trunnion 50, while the stud 56 enters a similar channel 58 in the elongated hub of the rocker 34. It will, therefore, be clear that when the knob 52 is operated one rocker 46, through the described parts will be moved into the range of action of the dogs 44 and 45, while the other will be simultaneously moved out of said range of action. In Figs. 4 and 5 the rocker 46 is shown as out; that is out of the path of the two dogs while the rocker 34 is shown in, this relation having been brought about by pulling out the knob 52. By moving the knob in, the positions the two rockers are shown as occupying in Fig. 5 will be reversed.

In the base portion of the rocker 46 there is an elongated bore 59 through one end of which the spring plunger 60 (Figs. 4 and 5) extends for sliding movement, the operating spring being denoted by 61. The plunger is socketed to receive the spring 61, one end of which bears against the bottom of the socket, while the other end of which bears against a screw plug 62 closing the outer end of said bore 59. Motion of the rocker 46 is limited by suitable stops, the screws 63 and 64 tapped through the bottom of the housing 27 being shown for this purpose. When the rocker 46 is in and the rocker 34 out, the beveled forward end of the spring plunger 60 will be in position to coöperate with the active end of the bar 33 which is made up of the converging inclined faces 65 and 66 (Fig. 4).

It will be assumed that both rockers 46 and 34 are in their normal positions; that is those they occupy during work and that the rocker 46 has been shifted over to the position it is shown as occupying in Fig. 4, by the dog 44. With the parts in this relation the carriage 4 will be moved toward the right in Fig. 4. Just before the carriage 4 completes its movement toward the right the dog 45 will engage the upper end of the rocker 46 and will thereby swing said rocker 46 in a corresponding direction, causing the pointed end of the plunger 60 to ride up the inclined face 65 and thereby the recession of the plunger and the compression of the spring 61, this motion continuing until the plunger reaches the mergence of the two faces 65 and 66 at which point the spring plunger 60 acting against the face 66 swings over the rocker or lever 34 to thereby as already described, cause the clutch member 16 to move out of engagement with that one of the gears (13 or 14) which it may engage and into engagement with the other of said gears to reverse the movement of the carriage. On the opposite movement of the carriage the reversing is secured through the dog 44 only at this time the spring plunger 60 rides down the inclined face 66. Motion of the rocker 34 is limited by suitable stops such as screws 67 and 68 duplicates of the screws 63 and 64 and like the latter tapped through the bottom of the boxing 27.

On the shaft 19 (Fig. 5) is fastened a spur gear 69 in mesh with the pinion 70 loose on the shaft 15 which two gears constitute one of several ways for driving the shaft 15 or its equivalent at a rapid speed and thereby through said shaft and the mechanism already described or analogous means, causing a correspondingly accelerated movement of the carriage 4. Any desirable means may be provided for connecting the pinion 70 with the shaft 15, the clutch member 71 being shown for this purpose and being peripherally grooved to receive the projections 72 on the branches of the yoke 73 fastened in some convenient manner to the rock shaft 74 supported for rocking movement by the bed 2 and extending entirely through the boxing 75 on the front of the bed. As a means for operating the rock shaft 74 and thereby the clutch 71, said shaft may be equipped with a hand lever or crank 76 fastened at its forward end and shown in Figs. 1, 3 and 5 as occupying its normal position. When the crank 76 is swung upward it rocks the shaft 74 and causes the clutch member 71 to engage the pinion 70 so that as already noted the carriage or table 4 can through the described mechanism be moved at a quite rapid speed. During work this crank or hand lever 76 is positively locked against movement, and the means whereby this result is secured can vary decidedly, although those now to be described and shown have been found satisfactory. The handle portion 77 of the crank or lever 76 as best shown in Figs. 1 and 5, is furnished with a lateral extension 78 notched as at 79 to receive a tooth or detent on the locking arm 80 which locking arm extends from the bushing 51. When the main feed or driving mechanism is in action the tooth at the end of this arm 80 is seated in the notch 79 to thereby prevent swinging movement of the lever 76 and therefore the throwing into action of the quick speed driving mechanism. On moving the locking arm 80 laterally by pulling forward on the bushing 50, the tooth of said locking arm is carried out of the notch 79 to free the lever or crank 76, so that it can be swung up to accomplish the result already set forth. It will be remembered that when the bushing it pulled forward the rocker 46 is moved out and simultaneously the rocker 34 is moved in. When the quick feed mechanism is in position to be thrown into action the normal feed mechanism should be so locked that it or either of the sub-mechanisms thereof cannot be thrown into operation and locking means connected with the bushing 51 serves satisfactorily in this connection, said bushing for such purpose being shown provided with a short arm 81, the free end of which is movable into a notch 82 on the lateral extension 83 on the hub of the hand lever 29. It will, therefore, be clear that when the hub 51 is pushed out the lever 29 is locked and at the same time the lever 76 is released, the reverse action taking place on the inward movement of the said bushing. It will also be apparent that when the bushing 51 is pulled out the rocker 46 is moved forward, while the rocker 34 is moved backward and vice versa on the inward movement of the bushing. When, therefore, the arm 76 is manipulated to throw in the quick feed, the clutch member 16 at the same time is operated by the handle 41 to put the clutch member 16 into engagement with one of the bevel pinions 13 and 14. The carriage 4 through the described parts will now be operated at a rapid speed, and when it has practically completed the predetermined movement or up to a point where the work on said carriage is well from under the tool, hereinafter described, one of the dogs 44 or 45 will strike the upper end of the rocker 34 and as the carriage continues to move slightly beyond this point, said rocker will be moved to its neutral position and thereby through the intermediate parts will move the clutch member 16 to neutral position to stop the carriage.

To return the carriage rapidly to a position where the work will be brought so that the tool can operate upon the same, the lever 41 is operated by hand or otherwise, to effect the reversal of the carriage and just before the carriage reaches the point it should, one of the dogs 44 or 45 will act against the upper end of the rocker 34 and thereby through said rocker move the clutch member 16 to neutral position and stop the carriage. When the carriage is stopped the parts are returned to their original relations, and the main sub-feed mechanism which may be necessary is put into action.

As will be inferred from what I have already said the tool may be of any suitable character, although the one shown is a reducing tool such as a grinding wheel 85. Said wheel is shown fastened to the lower end of the shaft 86 (Fig. 2 for example) which extends through and rotates in the bearing 87 connected with the slide 88 supported and guided for vertical movement in ways on the column or upright 3. On the up and down movement of the slide 88 corresponding movements of the shaft 86 and therefore of the grinding wheel 85 follow as common in this art. The shaft 86 has a sliding movement through the bearing 89 on the bracket 90 fastened suitably to the column 3 and splined to said shaft is a driver therefor which may as shown consist of the pulley 91 connected by a belt 92 with a suitable source of power to thereby rotate the shaft 86 and therefore the grinding wheel 85. In the column 3 is a counterbalance weight 92 connected by a chain 93 or otherwise with the slide 88, the chain between its terminals extending over guide sheaves 94 and 95 mounted in the column 3 and bracket 90 respectively. Fastened suitably to the slide 88 is the support 96 to which the nut 97 is non-rotatively connected, said nut receiving the screw 98 vertically immovable and rotative in some convenient manner. There is shown fastened to the upper end of said screw 98 the pinion 99 connected by the gears 100 and 101 with the gear 102 fastened to the upper end of the shaft 103 supported by suitable bearings. It will be clear that on the rotation of this shaft 103 the tool 85 can be raised or lowered depending upon the direction in which said shaft 103 is turned.

The foregoing is a familiar mechanism for advancing and retracting a grinding wheel or like tool and being old and constituting in itself no part of my invention, has been but briefly described. One of a radically different character might be substituted therefor. There are two mechanisms for raising and lowering the tool 85, one being hand operable and the other automatically operable and the organization is such that these two mechanisms cannot possibly be in action at the same time. The hand mechanism is for advancing the tool toward and from the work in a rapid manner and the automatic mechanism is for securing the advance of the tool intermittently or step by step and at the same time slowly, and these mechanisms are adapted to be put in operative relation alternately with a shaft as 104 (Figs. 2, 5 and 9) and which is shown connected by bevel gearing denoted in a general way by 105 with the shaft 104. The two feeds and the means whereby they are governed will be hereinafter described. The automatic feed it might be noted receives in the present instance its motion from the rocker 46 which it will be remembered is oscillated by the reciprocatory carriage 4. Rigidly connected with said rocker is the toothed segment 106 in mesh with the pinion 107 shown as being of "barrel" type for a reason that will hereinafter appear and fastened to the shaft 108 mounted for rocking movement on the front of the bed 2. To this shaft is connected the crank arm 109 to which is pivoted a link 110 having a lost motion connection denoted by 111 with the rocker 112 (Fig. 4), the lost motion connection being a pin and slot one, the pin being on the rocker 112. The rocker 46 is shown in the position to which it would be shifted by the dog 44. It will be understood in Fig. 4 that the rocker 46 is out, but nevertheless it occupies the position it would when swung over by said dog 44 as the carriage or table moves toward the left in Fig. 4. As the carriage moves toward the right in said figure during work, the upper end of the rocker 46 is struck by the dog 45 and swung over thereby through the intermediate parts moving the crank arm 109 a corresponding distance and likewise through the described parts imparting a similar movement to the rocker 112. On the opposite movement of the carriage the reverse action takes place. The connections between the rocker 46 and the rocker 112 are practically like those shown and described in Letters Patent No. 940,929, granted to me November 23, 1909 and have, therefore, been but briefly described.

The rocker 112 is loosely mounted on the hollow or tubular shaft 113 (Fig. 9) and it has pivoted to it a pawl 114 coöperative with the ratchet wheel 115 (Figs. 3, 4, 5 and 9). Mounted on the outer projecting end of the hollow shaft 113 is the sleeve 116 to which is shown connected by the pin 117 said ratchet wheel 115, the pin also extending through the shaft 118 inclosed by the hollow shaft 113. It will, therefore, be clear that the ratchet wheel 115, sleeve 116, shaft 118 and shaft 113 rotate together. Loosely carried by the sleeve 116 is the index wheel 119 adjacent to which is the carrier 120 for the guard 121 which guard projects across the peripheries of the index wheel 119 and ratchet wheel 115. It will be noticed that the two parts 119 and 120 are adjustable around the sleeve 116 being held in their adjusted positions by spring shoes as 122 and 123 respectively as shown best in Fig. 9. The means whereby the effect of the ratchet wheel 115 is transferred to the tool 85 will be hereinafter described. The length of stroke of the rocker 112 and thereby the degree of movement of the tool 85 may be governed in any desirable manner, for instance by an adjustable stop such as the screw 124 tapped through a lug 125 (Fig. 4) on the front of the boxing 75 and against which the rocker 112 is adapted to abut on its backward movement. The purpose of the guard 121 is to stop the automatic feed when the tool 85 has completed a certain amount of movement, and this occurs when the guard 121 moves under the toothed end of the pawl 114. The automatic feed mechanism just described is one of many forms that may be adopted and is practically like that shown in the Letters Patent to which I have already referred. Supported by a suitable bearing on the front of the machine is the hand operated shaft 126, the hand wheel 127 (Fig. 9) constituting a convenient device for turning said shaft. Fastened by pinning or otherwise to the inner end of said shaft is the pinion 128 in mesh with the idler 129 supported rotatively in the boxing 75 and in mesh with the pinion 130 fastened in some suitable way to the hollow shaft 113. The inner end of the shaft 104 is fitted in the tubular shaft 131 which receives telescopically within it the hollow shaft 113. Surrounding the inner end of the tubular shaft 131 and pinned or otherwise suitably connected therewith is the clutch sleeve 132 which receives within it the clutch member 133 which has teeth on its opposite sides to coöperate with teeth on the spur gear 134 and clutch member 135, the latter being connected by pinning or otherwise with the hollow shaft 113. The clutch member 133 has in it an annular groove 136 to receive the terminals of the pin 137 held against accidental displacement by the spring plunger 138 acting as a convenient detent for such purpose. This pin 137 prevents in no wise the free rotation of the clutch member 135, although it is adapted when the shaft 113 is moved endwise to move the clutch member 133 laterally to connect said clutch member with the clutch section 135 or with the gear 134. Extending from the clutch member 133 is the pin 139 which extends through the elongated slot 140 in the clutch sleeve 132 and which also enters a hollow in the sleeve 141 slidable on the clutch sleeve 132. For thus operating the sleeve 141 the yoke 142 may be provided, the branches of the yoke 142 having studs 143 to enter a circumferential channel in the sleeve 141 (Fig. 3). The yoke 142 is fastened to the shaft 144 (Fig. 9) supported by suitable means in the bed 2, said shaft having in addition fastened to it the crank arm 145 to the upper end of which the rod 146 is connected, said rod having attached to its forward end, on the front of the boxing 27 the hand lever 147. Fastened to the sleeve 116 is the cap 148 which bears against the carrier 120. It will be clear, therefore, that when the clutch member 133 is shifted, the two shafts 113 and 118 and hence the parts 115, 119 and 120 are carried therewith. The spur gear 134 meshes with the pinion 149 (Fig. 10) on the shaft 150 in the boxing 75, the spur gear 151 being fastened as by pinning or otherwise to the laterally-extending hub of the pinion 149. The spur gear 151 is in mesh with the pinion 130, to which I have already referred and which it will be remembered is fastened to the hollow shaft 113.

In Fig. 9 the clutch member 133 is shown as being in mesh with the spur gear 134 and at the same time the pawl 119 is in position to coöperate with the teeth of the ratchet wheel 115 as shown for example in Fig. 5. Therefore, as the rocker 112 oscillates the ratchet 115 will be advanced and as it moves it turns through the pin 117 the shafts 118 and 113 therewith and as the shaft 113 rotates it carries therewith the pinion 130 thereby through the gears 151 and 149 rotating the spur gear 134. It is assumed at this time that the clutch member 133 is in clutched relation with the spur gear 134. It should be noted that the clutch member 133 is in constant clutched relation with the clutch section 132. It, therefore, follows that in the described case the hollow shaft 131 is automatically and slowly turned to effect the step by step advance of the tool 85. The gears 130, 151, 149 and 134 constitute a speed-reducing train as will be clear. It will be understood that the clutch member 133 is moved into clutching relation with the gear 134 by a forward pull on the rod 146 the effect of which rod is transferred through the described connections to said clutch member 133. It will also be evident that as the clutch member 133 turns it does not apply its effect to the pin 137 owing to the described connection between the two parts; the only function in fact of said pin 137 is to move the clutch member 133 laterally or along the hollow shaft 113. It is essential that when the hand operable mechanism (utilized to rapidly shift the tool 85) is in action, the pawl and ratchet mechanism to which I have referred should be out of action as otherwise the work might be ruined or the mechanism seriously injured. This result can best be obtained by moving the ratchet wheel 115 out of the range of action of the pawl 114 and at the same time moving the index wheel 119 which is peripherally plain into the path of movement of the pawl, which may be accomplished when the clutch 133 is disengaged from the gear 134 and moved into engagement with the clutch section 135 which particular action, as will be evident, is obtained by the movement toward the right in the present case, of the shafts 118 and 113 under the primary influence of the rod 146; that is by thrusting said rod 146 inward. On such motion of the rod the sleeve 141 and thereby the clutch member 133 through the pin 139, is moved to cause the clutch member 133 to engage the clutch section 135, thereby disconnecting the power feed from the tool 85 and at the same time as already noted throwing the pawl and ratchet mechanism out of action. When the clutch member 133 engages the clutch section 135 the tool will be raised and lowered as follows: from the shaft 126, by the action of the hand wheel 127 to pinion 129, pinion 128, pinion 130, shaft 113, clutch section 135, clutch member 133, clutch section 132, shaft 131 to shaft 104 and from the latter through the mechanism already described to the slide 88.

What I claim is:

1. The combination of a traveling carriage, main and auxiliary driving mechanisms therefor, and mechanism for automatically reversing the carriage when the main driving mechanism is in action and for automatically stopping the carriage at a predetermined point, when the auxiliary driving mechanism is in action.

2. The combination of a traveling carriage, main and auxiliary driving mechanisms for the carriage and mechanism comprising means movable with the carriage, for automatically effecting reverse movement of the carriage when the main driving mechanism is in action and for automatically stopping the carriage at a predetermined point, when the auxiliary driving mechanism is in action.

3. The combination of a traveling carriage, main and auxiliary driving mechanisms therefor, mechanisms for automatically reversing the carriage when the main driving mechanism is in action and for automatically stopping the carriage at a predetermined point, when the auxiliary driving mechanism is in action, and means for positively preventing the main and auxiliary driving mechanisms being simultaneously in action.

4. The combination of a reciprocatory carriage, a rotary shaft, two power transmitting members loose on the shaft connected with and adapted to move the carriage in opposite directions, a clutch member for alternately clutching the power transmitting members to the shaft on the movement of said clutch member oppositely from its neutral position, main driving mechanism for the carriage, auxiliary driving mechanism for the carriage, and means for putting the main or the auxiliary driving mechanism into power-transmitting relation with said clutch member.

5. The combination of a reciprocatory carriage, two power transmitting members connected with and adapted to move the carriage in opposite directions, controlling mechanism for alternately putting said power transmitting members in action, main driving mechanism for the carriage, auxiliary driving mechanism for the carriage to operate the same at a higher speed than the main driving mechanism, and mechanism for putting the main or the auxiliary driving mechanism into power transmitting relation with said controlling mechanism to drive the carriage.

6. The combination of a reciprocatory carriage, a shaft, two power transmitting members loose on said shaft, connected with and adapted to move the carriage in opposite directions, a clutch connected with the shaft, between the power transmitting members, for alternately clutching said power transmitting members to said shaft, main driving mechanism, means for connecting at will said main driving mechanism with said shaft, auxiliary driving mechanism, and means for clutching at will the auxiliary driving mechanism to said shaft, the auxiliary driving mechanism being adapted to rotate said shaft at a higher speed than the main driving mechanism.

7. The combination of a reciprocatory carriage, a shaft, two power transmitting members loose on said shaft, connected with and adapted to move the carriage in opposite directions, a clutch connected with the shaft, between the power transmitting members, for alternately clutching said power transmitting members to said shaft, main driving mechanism, means for connecting at will said main driving mechanism with said shaft, auxiliary driving mechanism, means for clutching at will the auxiliary driving mechanism to said shaft, the auxiliary driving mechanism being adapted to rotate said shaft at a higher speed than the main driving mechanism, and means for positively preventing the main driving mechanism being put into action when the auxiliary driving mechanism is in action and vice versa.

8. The combination of a reciprocatory carriage, a rotary shaft, bevel gears loose on the shaft, means involving a bevel gear meshing with said other bevel gears for operating the carriage, a clutch rotative with the shaft for alternately clutching the bevel gears thereto, two trains of driving gears, the terminals of the trains being loose on the shaft, means for alternately clutching said terminal gears to said shaft, the two trains of gears being adapted to rotate said shaft at different speeds, a third train of gears, the terminal of which is also loose on the shaft, means for clutching the last mentioned terminal gear to said shaft, the last mentioned train of gears being adapted to drive said shaft at a higher rate of speed than either of the other trains.

9. The combination of a reciprocatory carriage, main and auxiliary driving mechanisms therefor, the auxiliary driving mechanism being adapted to operate the carriage at a higher speed than the main driving mechanism, mechanism for automatically reversing the carriage when the main driving mechanism is in action and for automatically stopping the carriage at a predetermined point when the auxiliary driving mechanism is in action, means involving hand levers, for putting the main and auxiliary driving mechanisms alternately into action, and means common to the two hand levers for positively preventing their simultaneous movement.

10. The combination of a reciprocatory carriage, main and auxiliary driving mechanisms therefor, mechanism for reversing the carriage when the main driving mechanism is in action and for stopping the carriage when the auxiliary driving mechanism is in action, said mechanism involving primary and secondary actuators, and means whereby when the main driving mechanism is in action the primary actuator will be operated and will in turn operate the secondary actuator to reverse the carriage and whereby the secondary actuator will be directly operated to stop the carriage when the auxiliary driving mechanism is in action.

11. The combination of a reciprocatory carriage, main and auxiliary driving mechanisms therefor, mechanism for reversing the carriage when the main driving mechanism is in action and for stopping the carriage when the auxiliary driving mechanism is in action, said mechanism involving primary and secondary actuators, and dogs on the carriage, the primary and secondary actuators being shiftable into and out of the path of movement of the dogs, the primary actuator when in the path of the dogs being adapted to be alternately operated thereby and in turn to operate the secondary actuator, said secondary actuator when directly operated by said dogs, being adapted to stop the carriage.

12. The combination of a reciprocatory carriage, a rotary shaft, power transferring members loose on the shaft, connected with and for moving the carriage in opposite directions, a clutch member for alternately clutching said power transferring members to said shaft, main driving mechanism, auxiliary driving mechanism, means for connecting the main and auxiliary driving mechanisms with said shaft, the auxiliary driving mechanism being adapted to rotate the shaft at a higher speed than the main driving mechanism, primary and secondary actuators, the primary actuator being adapted to shift the secondary actuator and the latter being connected with said clutch member, and means whereby the primary actuator will be operated by the carriage and in turn will operate the secondary actuator when the main driving mechanism is in action to shift said clutch member and reverse the carriage and whereby the secondary actuator will be directly operated by the carriage to move said clutch member to a neutral position to stop the carriage when the auxiliary driving mechanism is in action.

13. The combination of a reciprocatory carriage, a pair of members connected with and adapted to move the carriage in opposite directions, a device shiftable into operative relation alternately with said members, mechanism for driving said device at different speeds, and means whereby the carriage will be caused to shift said device to put the same into operative relation alternately with said members and effect reversal of the carriage when the carriage is being driven at a low speed and whereby said device will be shifted to a position to stop the carriage when the latter is being driven at a high speed.

14. The combination of a reciprocatory carriage, a pair of members connected with and adapted to move the carriage in opposite directions, a device shiftable into operative relation alternately with said members, mechanism for driving said device at different speeds, primary and secondary actuators, the secondary actuator being connected with said device for shifting the same and the primary actuator being adapted to shift the secondary actuator, and means whereby the primary actuator will be operated from the carriage when said device is driven at a low speed and whereby the secondary actuator will be operated from the carriage when the said device is driven at the high speed.

15. The combination of a reciprocatory carriage, a pair of members connected with and adapted to move the carriage in opposite directions, a device shiftable into operative relation alternately with said members, mechanism for driving said device at different speeds, primary and secondary actuators, the secondary actuator being connected with said device for shifting the same alternately into operative relation with said members and for shifting it out of operative relation with each of them, dogs on the carriage, the primary actuator being shiftable into a position to be directly engaged by the dogs, and being adapted when thus operated to shift the secondary actuator and thereby said device to put the latter alternately into working relation with said members and the secondary actuator being shiftable into position to be directly engaged by said dogs to shift said device out of working relation with both said members.

16. The combination of a reciprocatory carriage, a pair of members connected with and adapted to move the carriage in opposite directions, a device shiftable into operative relation alternately with said members, mechanism for driving said device at a low speed, independent mechanism for driving said device at a high speed, primary and secondary actuators, dogs on the carriage, means for simultaneously shifting the primary and secondary actuators into and out of the path of said dogs, the secondary actuator being connected with said device and the primary actuator when in the path of the dogs and when operated thereby being adapted to operate the secondary actuator to move said device alternately into engagement with said members to reverse the carriage and the secondary actuator when engaged by either dog being adapted to move said device out of operative relation with both said members.

17. The combination of a reciprocatory carriage, a pair of members connected with and adapted to move the carriage in opposite directions, a device shiftable into operative relation alternately with said members, mechanism for driving said device at a low speed, independent mechanism for driving said device at a high speed, primary and secondary actuators, dogs on the carriage, means for simultaneously shifting the primary and secondary actuators into and out of the path of said dogs, the secondary actuator being connected with said device and the primary actuator when in the path of the dogs and when operated thereby being adapted to operate the secondary actuator to move said device alternately into engagement with said members to reverse the carriage and the secondary actuator when engaged by either dog being adapted to move said device out of operative relation with both of said members, and means for preventing the high speed mechanism being put into action when the primary actuator is in the path of the dogs and for preventing the low speed mechanism from being thrown into action when the secondary actuator is in the path of said dogs.

18. The combination of a reciprocatory carriage, a pair of members connected with and adapted to move the carriage in opposite directions, a device shiftable into operative relation alternately with said members, mechanism for driving said device at different speeds, primary and secondary actuators, the secondary actuator being connected with said device for shifting the same and the primary actuator being adapted to shift the secondary actuator, means whereby the primary actuator will be operated from the carriage when said device is driven at a low speed and whereby the secondary actuator will be operated from the carriage when said device is driven at the high speed, and means for manually moving said device.

19. The combination of a reciprocatory carriage, a pair of members connected with and adapted to move the carriage in opposite directions, a device shiftable into operative relation alternately with said members, mechanism for driving said device at different speeds, primary and secondary actuators, the secondary actuator being connected with said device for shifting the same and the primary actuator being adapted to shift the secondary actuator, means whereby the primary actuator will be operated from the carriage when said device is driven at a low speed and whereby the secondary actuator will be operated from the carriage when the said device is driven at the high speed, and means for releasably holding said device in its neutral position.

20. The combination of a traveling carriage, primary and secondary actuators, the primary actuator being adapted to shift the secondary actuator, means whereby the carriage can be caused to operate at will either of the actuators, and means governed by the secondary actuator for governing the feed of the carriage.

21. The combination of a reciprocatory carriage having dogs, primary and secondary actuators each shiftable into and out of the path of the dogs, the primary actuator when in said path being operable by said dogs and being adapted to operate the secondary actuator and the latter when in said path being operable by said dogs, and means governed by the secondary actuator when shifted by the dogs or by the primary actuator, for controlling the feed of the table.

22. The combination of a reciprocatory carriage having dogs, primary and secondary actuators each shiftable into and out of the path of the dogs, the primary actuator when in said path being operable by said dogs and being adapted to operate the secondary actuator and the latter when in said path being operable by said dogs, means for driving the carriage at a low speed, means for driving the carriage at a high speed, independent manually operable means for throwing the high or low speed means into action, a carriage reverse controlling and stopping device governed by the secondary actuator, and means for preventing the low speed means from being thrown into action when the secondary actuator is in the path of the dogs and for preventing the high speed means from being thrown into action when the primary actuator is in the path of said dogs.

23. The combination of a reciprocatory carriage having dogs, primary and secondary actuators, a rocker connecting the two actuators, means for operating said rocker to shift the primary actuator into the path of the dogs and the secondary actuator out of the said path and vice versa, the primary actuator when in said path being operable by said dogs and being adapted to operate the secondary actuator and the latter when in said path being operable by said dogs, means for driving the carriage at a low speed, means for driving the carriage at a high speed, independent manually operable means for throwing the high or the low speed means into action, a carriage reverse controlling and stopping device shiftable by the secondary actuator into a carriage stopping position when said secondary actuator is in the path of said dogs and shiftable by said secondary actuator into carriage reversing positions when the primary actuator is in the path of said dogs, and means movable with said rocker for preventing the low speed means being thrown into action when the secondary actuator is in the path of said dogs and for preventing the high speed means from being thrown into action when the primary actuator is in the path of said dogs.

In testimony whereof I affix my signature in presence of two witnesses.

BENGT M. W. HANSON.

Witnesses:
W. N. STORRS,
S. M. KILBOURNE.